June 14, 1966  F. MANASEK ET AL  3,255,790
TABLE MILLING MACHINE WITH SEVERAL MILLING SPINDLES
Filed Oct. 28, 1963  7 Sheets-Sheet 2

INVENTORS
FRIEDRICH MANASEK et al
BY
*Nolte and Nolte*
ATTORNEYS

June 14, 1966 F. MANASEK ETAL 3,255,790
TABLE MILLING MACHINE WITH SEVERAL MILLING SPINDLES
Filed Oct. 28, 1963 7 Sheets-Sheet 5

INVENTORS
FRIEDRICH MANASEK et al
BY
Nolte and Nolte
ATTORNEYS

INVENTORS
FRIEDRICH MANASEK et al
BY
Nolte and Nolte
ATTORNEYS

United States Patent Office 3,255,790
Patented June 14, 1966

3,255,790
TABLE MILLING MACHINE WITH SEVERAL
MILLING SPINDLES
Friedrich Manasek and Artur-Edmund Manasek, both of
32 Langgarten, Heidelberg-Kirchheim, Germany
Filed Oct. 28, 1963, Ser. No. 319,605
Claims priority, application Germany, Oct. 29, 1962,
H 47,259
17 Claims. (Cl. 144—134)

In the usual table milling machines which are used for working wood and plastic and the like and which are only provided with one milling spindle, the change of tool and adjustment of the tool which are necessary take up a considerable part of the working time and call for skilled operators. It is therefore advantageous to use a table milling machine to which the present invention relates and which possesses several milling spindles which are arranged on a support which can swivel around a vertical axis in such a way that by swivelling this support one of these milling spindles can be brought into the working position at a time.

In a known table milling machine of this construction a swivelling milling spindle support designed as a pedestal is arranged beside the table of the machine. The milling spindles driven by individual motors are arranged on fairly long supporting arms belonging to the swivelling support, and these arms are designed as guide rails for the milling units or their transverse supports. This type of construction is not only expensive, but it also possesses the considerable disadvantage of taking up a very great deal of room. Furthermore it is hardly possible to carry out accurate milling work with such a table milling machine because the mounting of the milling units is not sufficiently stable. The defects of this known construction are done away with in a table milling machine according to the present invention in that the milling spindle support is arranged underneath the table of the machine which has an aperture for the passage of the cutter, and the milling spindles are mounted on the support so that they can be moved vertically in such a way that the milling spindle which is required at any given time together with the cutter fixed on to it can be moved upwards through the aperture in the table and into the working position. Furthermore, according to the present invention there is provided underneath the machine table a single motor which drives the milling spindle which is located in the working position by means of a belt drive or the like.

The invention makes it possible, whilst saving a considerable amount of material, to provide an extremely compact and simple construction of a table milling machine possessing several milling spindles. The arrangement of the tool carrier underneath the machine table also makes possible an extremely stable mounting of this carrier or of the milling spindles and furthermore permits of a rapid change of milling spindles.

The details of the invention are explained below in greater detail on the basis of an example of execution shown in the drawing.

FIG. 1 gives a diagrammatic representation of a table milling machine according to the invention.

Figure 1:
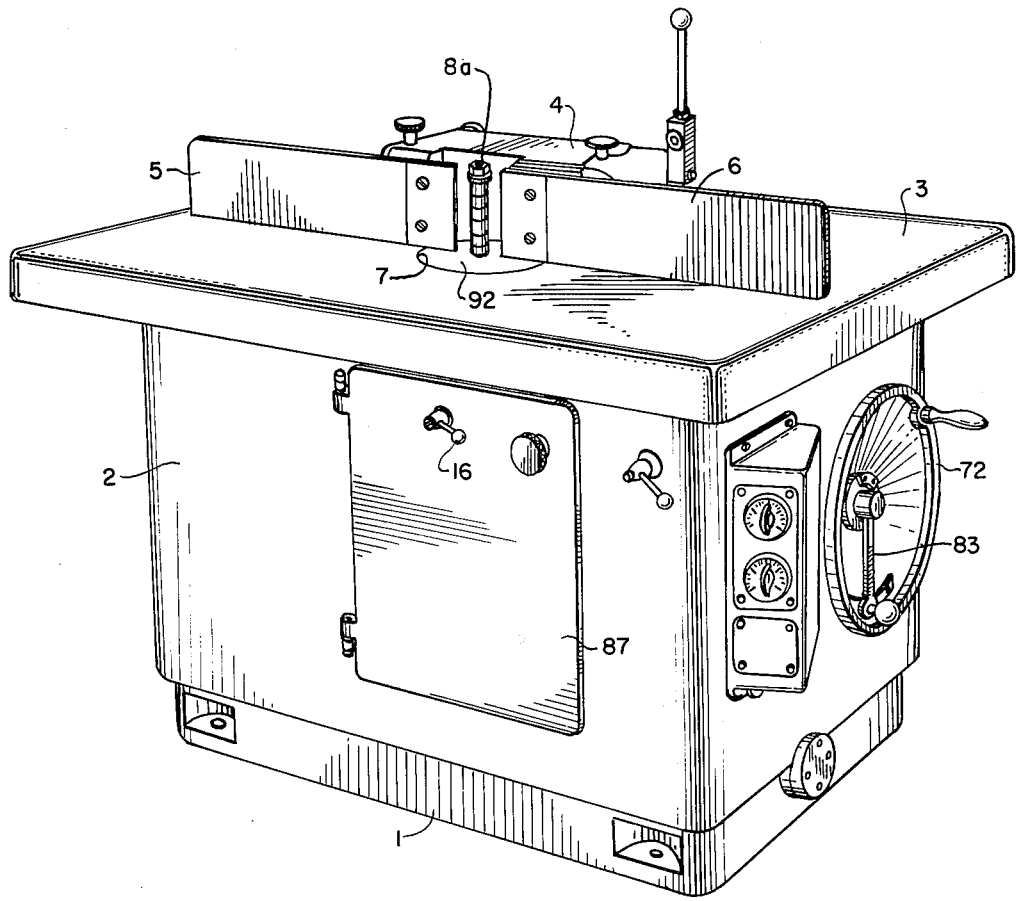
Figure 2:
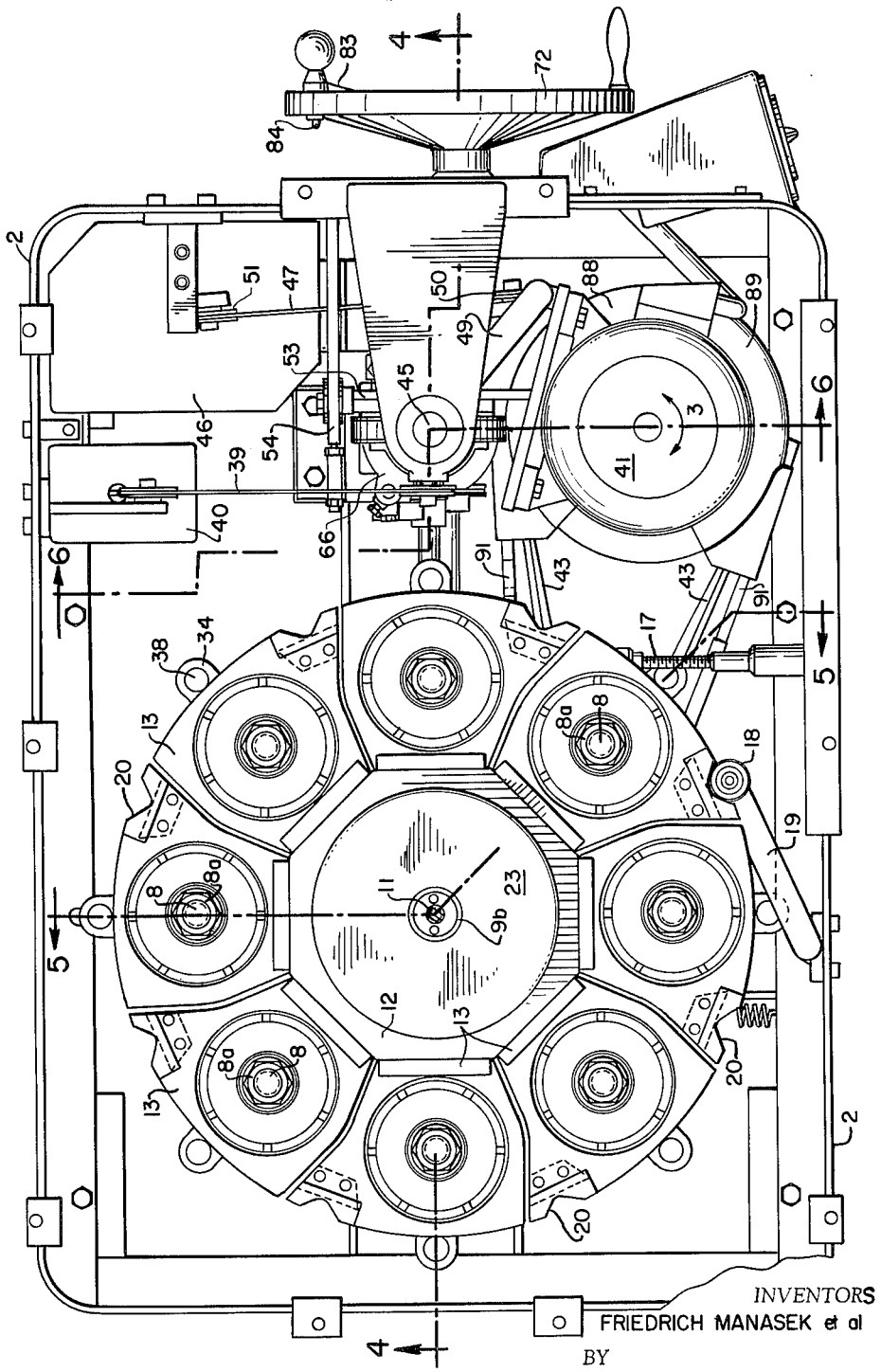
FIG. 2 shows a plan view of the machine without machine table.

As shown in the drawing, and in FIG. 1 in particular, the housing of the table milling machine consists of a base frame 1, a casing 2 and a table top 3. The stops for the workpiece, which can be adjusted on this table 3 by means of a device 4, are indicated at 5 and 6. The table top has an aperture 7 for the passage of the cutter-carrying milling spindle 8a, which is shown in the working position in FIG. 1. From FIGS. 2, 4 and 5 it can be seen that there is provided a vertical supporting column 9a, 9b, connected with the base frame 1 on the one hand and with the table top 3 on the other hand by means of the bolts 10, 11. On this the milling spindle support is mounted so that it can rotate, and this consists of a drum 12, preferably of polygonal cross section, and several clamping sleeves 13 fixed on to the side surfaces of this drum. In these sleeves there are mounted the bearing sleeves 14 which can be adjusted for height and can be clamped in position and secured against rotation, and in these the milling spindles 8 are mounted. 8a shows the milling spindle which is in the working position, and in FIGS. 4 and 5 it is in its lowest position, in which the milling spindle 8a with the cutter shown at 15 is located underneath the table top 3. The clamping sleeve 13 has a longitudinal slot so that it can be clamped together by means of a screw device, and in this way the bearing sleeve 14 can be clamped in the sleeve 13 in the upper working position as shown in FIG. 1. For this purpose there is provided, as shown in FIGS. 1 and 2, a key 17 to be operated with a handle 16. The screw device for the longitudinally slotted clamping sleeve 13 is simply in the nature of a turnbuckle in that it includes an elongated threaded member having oppositely threaded portions respectively engaging oppositely threaded nuts which are respectively carried by portions of the sleeve adjacent opposite sides of the longitudinal slot thereof. The rotary threaded member of this screw device is formed at one end with a non-circular recess, and the key 17 has a free end of a mating non-circular cross section, this key being supported for longitudinal movement through an opening in the door 87 so that the handle 16 which is accessible at the outside of the door 87 may be actuated by the operator when the door 87 is closed to longitudinally move the key 17 into the recess of the threaded member of the screw device to enable the latter to be turned in one direction or the other for tightening or loosening the clamping sleeve 13.

In order to secure the working position of the milling spindle at any given time there is provided on the casing 2 according to FIG. 2 a spring-loaded stop lever 19 which is advantageously provided with a roller 18, and on the spindle carrier 12, 13, there are provided notches 20 in which the roller 18 of the stop lever engages.

Figure 4:
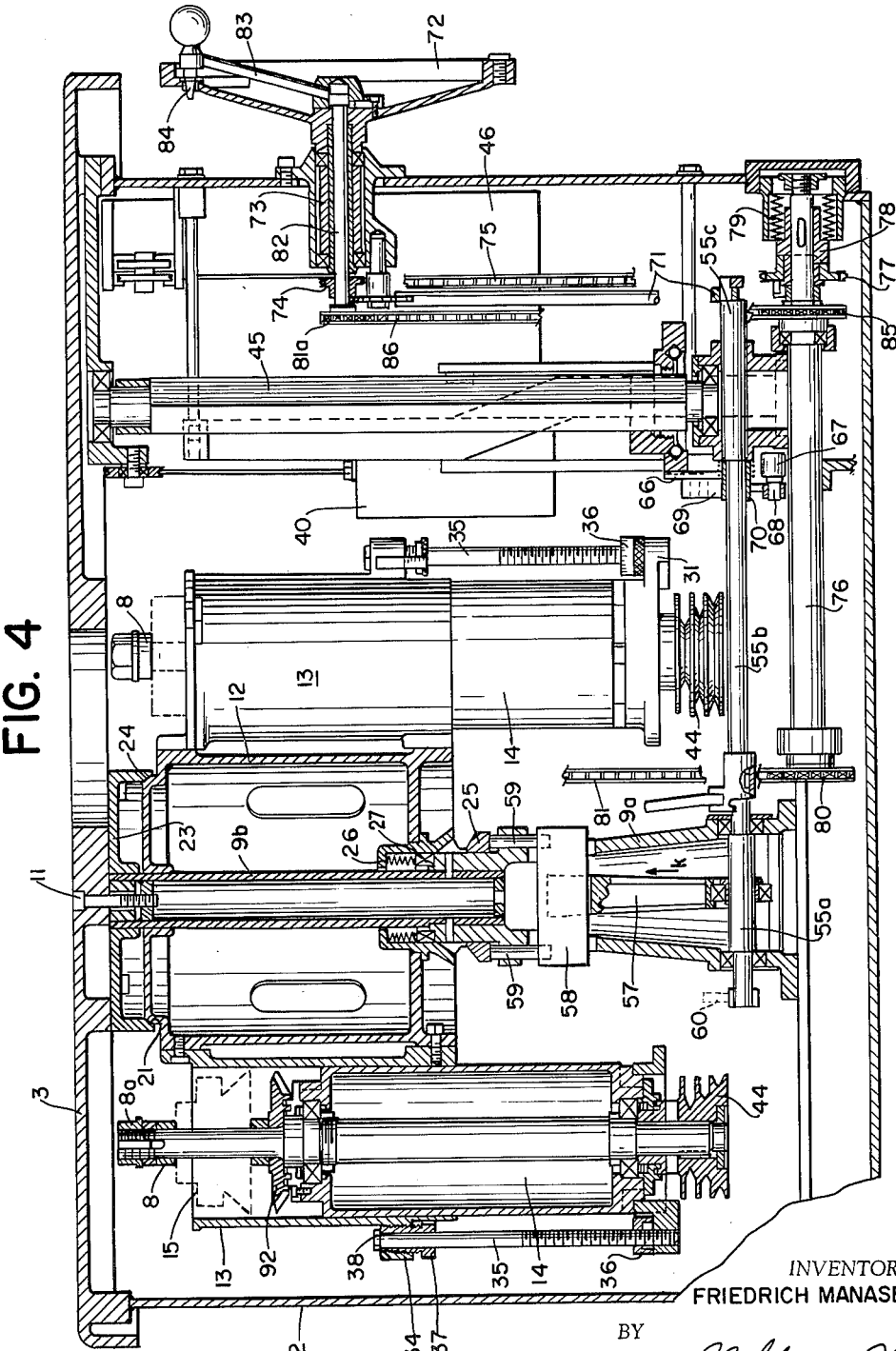
FIG. 4 shows a vertical section along the line 4—4 of FIG. 2.
Figure 5:
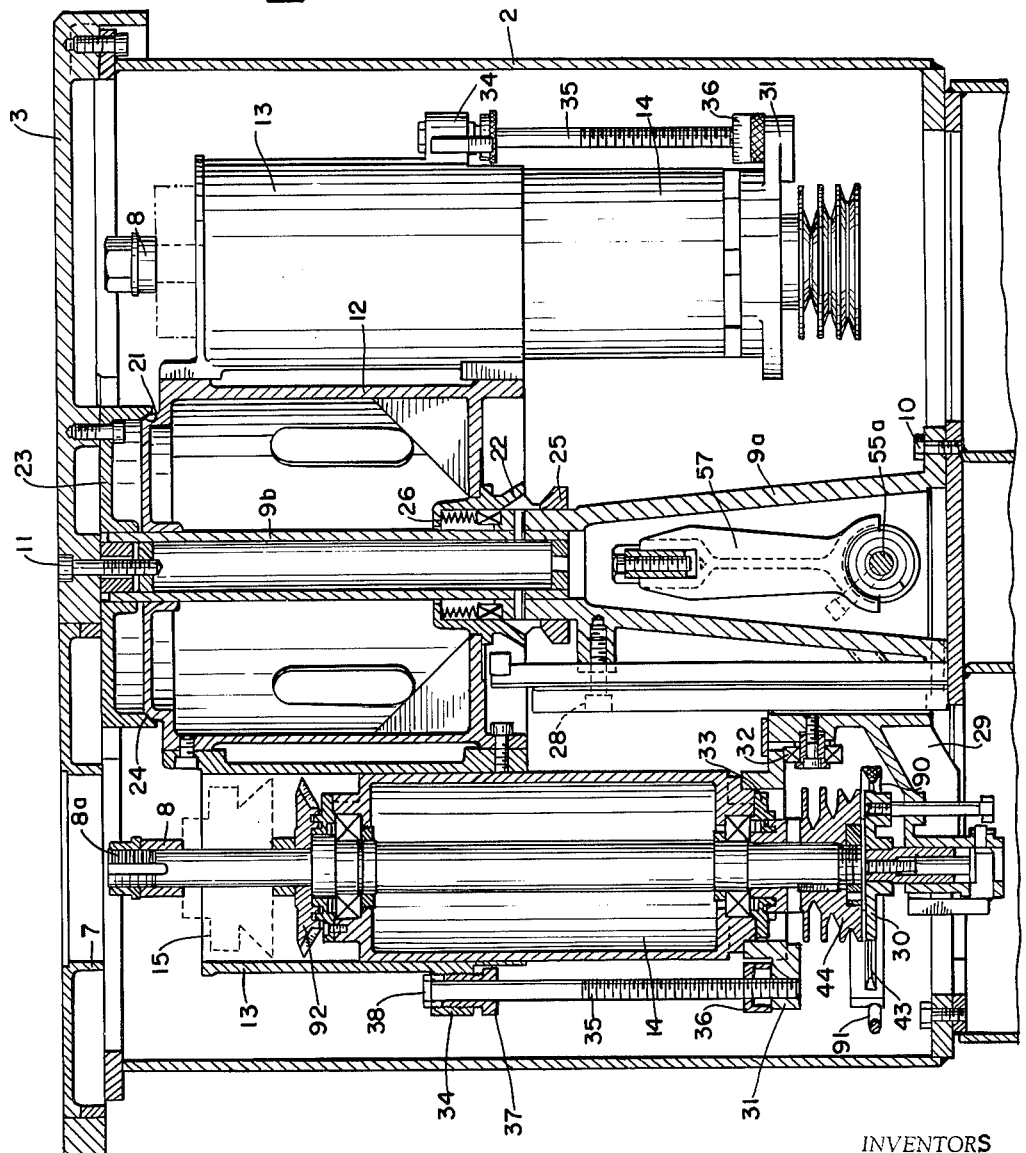
FIG. 5 shows a vertical section along the line 5—5 of FIG. 2.

As can also be seen from FIGS. 4 and 5, the drum 12 possesses at its top and bottom ends tapered annular surfaces 24 and 22, respectively, and at plate 23, firmly attached to the table top 3, and the supporting column 9a there are provided counter-tapered clamping members 21 and 25 which co-operate with the tapered annular surfaces 24, 22 and secure the drum 12. For this purpose the clamping member 25 is advantageously slotted longitudinally and is arranged on the supporting column 9a so that it can be adjusted in height, so that it can be moved upwards for the purpose of clamping the drum and downwards for releasing same. By means of this taper clamping of the drum, which is carried out with the working spindle 8a in the working position, one obtains an extraordinarily rigid mounting of the spindle and consequently a high degree of accuracy in the milling machine.

In order to achieve an equilibrium of weight of the drum and of the clamping sleeves and bearing sleeves 13 and 14, the drum is supported by means of springs, advantageously plate springs 26, on an end bearing 27 designed advantageously as a ball bearing, on the bearing column 9a.

On the bearing column 9a there is fixed a vertical guide rail 28 (FIG. 5), on which there is mounted a lifting slide 29, which can be moved upwards and downwards by means of a chain drive described below. This lifting slide, which advantageously has a disc brake 30 for braking the working spindle 8a, serves for raising and lowering the bearing socket 14. Each bearing socket has at the bottom a lifting ring 31 which, when the spindle is in the working position, rests on a supporting roller 32 of the lifting slide 29 or on a holding-down device 33 fixed onto this slide. The lifting ring 31 also carries a vertical stop rod 35 which can be moved in a shoulder 34 of the clamping sleeve 13. On this and on the shoulder there are provided adjusting nuts 36 or 37 which serve to limit the travel of the bearing sleeve 14, the head 38 of the stop rod 35 resting on the stop nut 37, when the bearing sleeve 14 takes up its bottommost position. For the purpose of compensating for the weight of the lifting slide 29 loaded with the working spindle 8a and the bearing sleeve 14 there is provided a counterweight 40 which acts on this slide via a cable 39 (FIG. 2).

Figure 6:
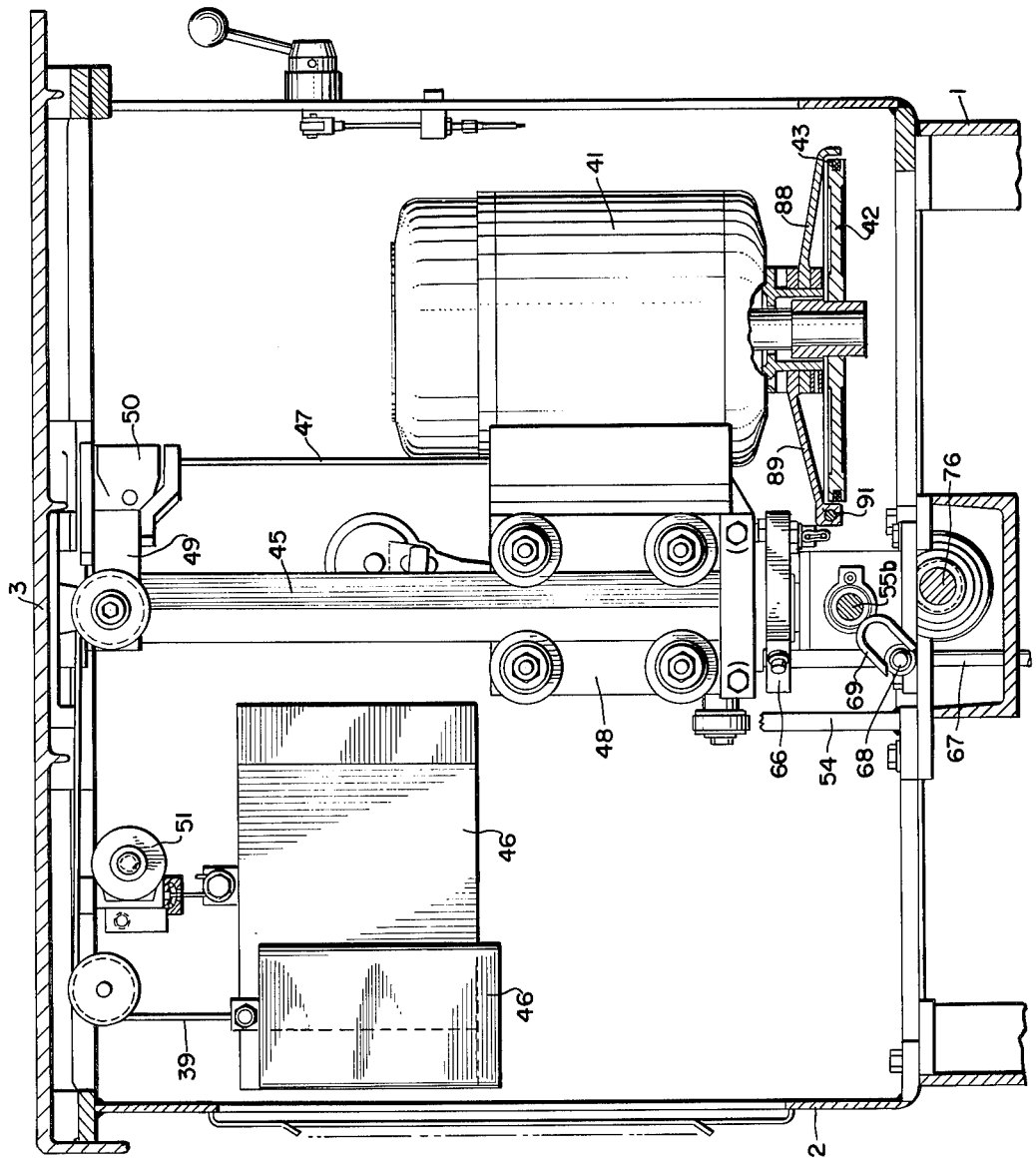
FIG. 6 shows a vertical section along the line 6—6 of FIG. 2.

In the casing 2 there is also provided a single drive motor 41 which drives the belt pulley 44 by means of a drive pulley 42 and a belt, advantageously a V-belt 43 (FIGS. 2 and 6). In order to obtain different rotation speeds this pulley 44 is designed as a stepped pulley. In view of the vertical movement of the working spindle, the drive motor 41 must also be raised and lowered together with the working spindle. In order to make it possible to bring another milling spindle into operation, it is not only necessary to release the V-belt 43 by taking it off the stepped pulley 44, but it is also necessary to bring the drive belt together with the motor 41 below the lowest position of the stepped pulley 44. For this purpose the motor is mounted so that it can slide on a vertical guide axle 45 and is also arranged so that it can swivel around this axle or with it in the directions shown by the arrow J (FIG. 2). In order to counterbalance the weight of the motor there is provided a counterweight 46 in such a way that this is swivelled around the guide axle 45 at the same time as the motor and in this way tightens the belt. A cable 47 is fixed to the slide 48 which carries the motor 41 and which is mounted on the axle 45, and this cable 47 passes around the guide pulley 50 arranged on an arm 49 supported for swivelling movement by the axle 45 and also around a further guide pulley 51, whence it passes to the counterweight 46. The supporting slide 48 of the motor has a swivelling arm 53 provided with a supporting roller 52 and there is arranged in the path of this supporting roller a stationary vertical guide wedge 54 which co-operates with it in such a way that when the motor moves downwards, shortly before the working spindle 8a reaches its bottom position, the motor is swivelled around the axle 45 in the clockwise direction J (FIG. 2) and in this way the V-belt is released.

Figure 3:
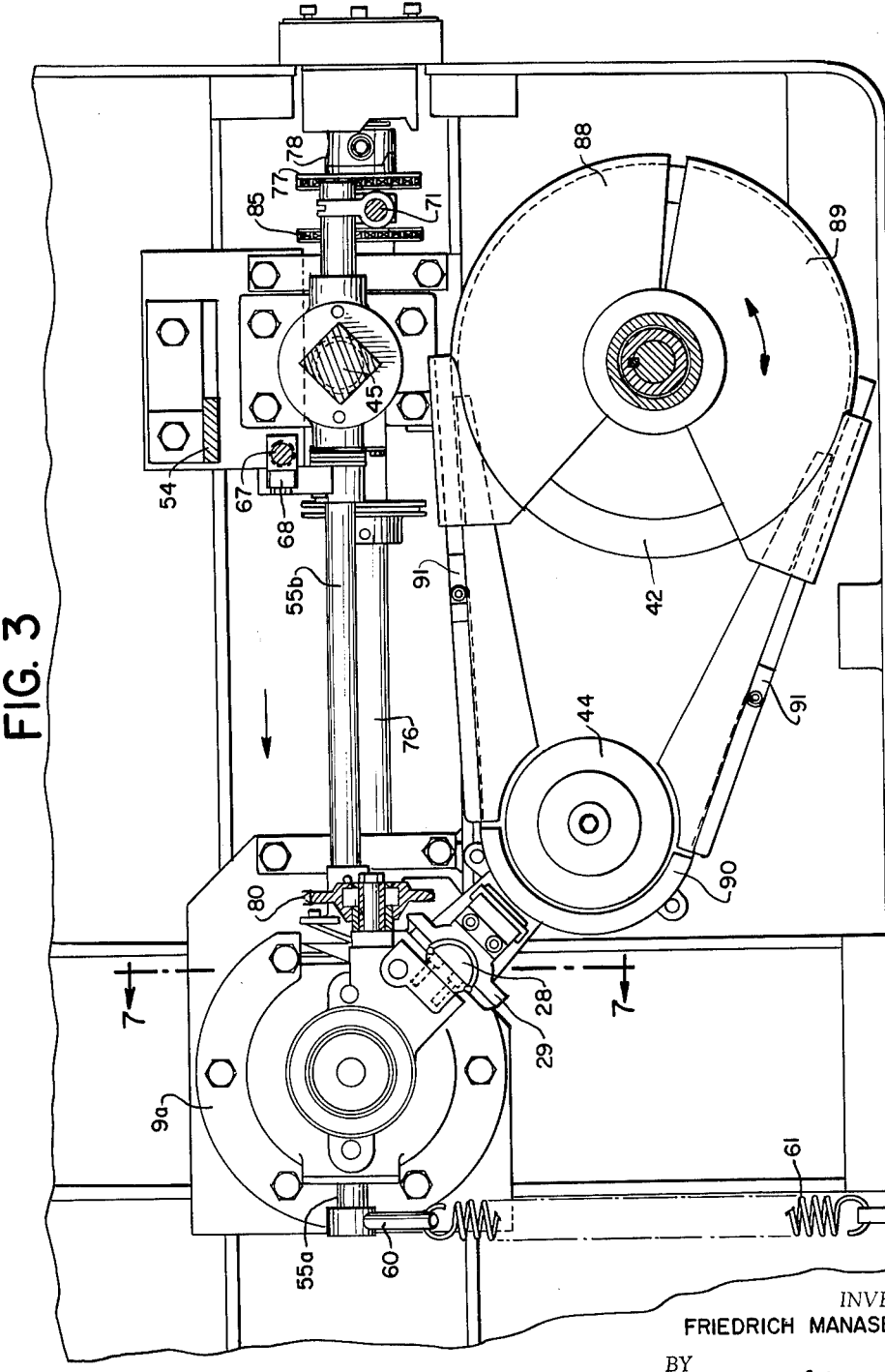
FIG. 3 shows a plan view of the machine without milling spindle support.

As can be seen from FIGS. 3, 4 and 6, there is provided a 3-part eccentric shaft 55a, 55b, 55c. By means of a ball bearing 56 there is mounted on the eccentric shaft 55a a push rod 57 which acts via a cross-piece 58 and the pressure pins 59 on the clamping member 25. On the eccentric shaft 55a there is mounted a lever arm 60 which, as a result of the action of a spring 61, swivels the eccentric shaft in such a way that the push rod 57 is pushed upwards in the direction K (FIG. 4) and as a result of this the clamping member 25 is pressed into and against the tapered annular surface 22 of the drum.

Figure 7:
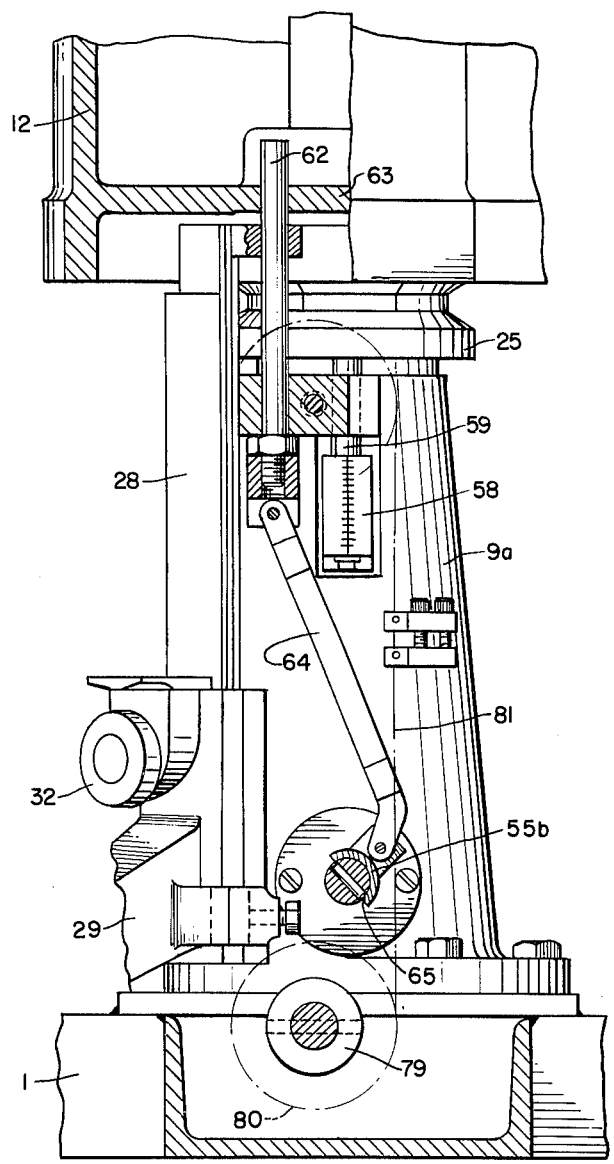
FIG. 7 shows a vertical section along the line 7—7 of FIG. 3.

In addition, according to FIG. 7 there is provided a bolt rod 62 which engages in corresponding holes provided in wall 63 of the drum 12 and in this way secures the drum in the working position from rotating. This bolt rod is connected via a guide with a coupling sleeve 65 mounted on the shaft 55b in such a way that the eccentric shaft 55a, 55b, as a result of the action of the spring 61, holds the bolt rod 63 in the bolted position as shown in FIG. 7, whereas during the downwards movement of the motor the eccentric shaft is swivelled and as a result of this the bolt rod 62 is withdrawn from the hole in the wall 63. For this purpose the motor supporting slide 48 has on its rotating ring 66 a rod 67 with a roller 68 which co-operates with a fork 69 which is mounted on the coupling sleeve 70 fixed on shaft portion 55b. During the downwards movement of the motor the roller 68 engages in the fork 69 so that during the further downwards movement the eccentric shaft 55a–55c is swivelled against the action of the spring 61. As a result of this swivelling movement, both the clamping taper 29 is moved downwards and also the drum 12 is unbolted as a result of the pulling of the bolt rod 62 downwards. Furthermore during this swivelling movement a locking bolt 71, the function of which will be explained later, mounted on the eccentric shaft 55c is pulled downwards.

For the lifting movement of the working spindle 8a there is provided a handwheel 72 which is mounted on a hollow axle 73 and drives the sprocket 77 mounted loosely on the shaft 76 by means of a sprocket 74 and a chain 75. Against a stepped oblique end surface of this sprocket 77 there is pressed by means of a spring 79 a coupling sleeve 78 which can slide on the shaft 76 but is secured against rotation, and in this way the sprocket 77 is connected with the shaft 76. On the latter there is mounted a sprocket 80, which acting via a guide wheel which is not shown in the drawing, drives an endless chain 81 which is connected with the lifting slide 29.

In the hollow axle 73 there is provided an axle 82 carrying a sprocket 81a which can be turned relative to the handwheel 72 by an adjusting lever 83, it being possible for the adjusting lever 83 to be made to engage by a pin 84 in a selected one of several holes in the handwheel 72. On the shaft 76 there is mounted a sprocket 85 which can rotate freely, and this is connected with the sprocket 81a by an endless chain 86, which in turn is fixedly connected with the lifting ring 66 of the motor support slide 48. When the handwheel 72 is rotated together with the adjusting lever 83 engaged with it, the chain drives which have just been mentioned and which are driven by the sprockets 74 and 81a move the working spindle 8a and the motor 41 downwards simultaneously and uniformly, so that then as a result of the swivelling of the fork 69 with the roller 68 the eccentric shaft 55a–55c is turned round, so that as a result of this the taper clamp of the drum 12 is released and the drum 12 is also unlocked by the withdrawal of the bolt rod 62. When this happens the locking bolt 71 of the eccentric shaft 55c is also pulled downwards, and this in its normal position as shown in FIG. 4 engages between the two sprockets 74 and 81. In the normal position, therefore, any withdrawal of the adjusting lever 83 from the holes in the handwheel is prevented, and therefore any mutual displacement as between the adjusting lever and the handwheel is rendered impossible. This displacement only becomes possible when the working spindle is located in the lowest position shown and the locking bolt 71 has been pulled downwards. If the handwheel 72 is then moved further, the end oblique surface of the sprocket 77 pushes the coupling sleeves 78 back against the action of the spring 79, so that the connection between the sprocket 77 and the shaft 76 is released and the sprocket 77 will continue to rotate freely. As against this, when the handwheel 72 is rotated still further the motor is moved still further downwards with the chain 86 so that the V-belt which has in the meantime been released from the stepped pulley 44 moves down to below the stepped pulley 44. In this bottom position, by a mutual displacement of the handwheel 72 and the adjusting lever 83, it is possible to select the desired belt pulley stage, that is to say the gear ratio for the next working spindle. As soon as the V-belt is located underneath the stepped pulley 44 it is possible, after opening the door 87 (FIG. 1), to turn the drum 12 with the spindles by hand until the selected spindle arrives in the working position. When the handwheel 72 is rotated in a clockwise direction the lifting operation takes place, when first of all only the motor is lifted until the V-belt has reached the height of the desired step of the belt pulley 44 and as a result of the tightening of the belt (the swivelling of the motor in counterclockwise direction J, indicated in FIG. 2) engages in the belt pulley 44. Upon further rotation of the handwheel the coupling sleeve 78 is then pressed again into the position shown in FIG. 4 and when this happens the sprocket 77 is once again connected with the shaft 76 so that then the motor and working spindle are raised uniformly by the chains 75 and 86 or 81 and are brought into the working position.

In order to prevent the V-belt 43 from falling out of the belt pulleys 42 and 44 suitable belt guides 88, 89 and 90 are provided, the guide 90 being designed so as to have a U-shaped cross-section and being connected with belt guide rods 91 which are mounted so as to slide in the belt guides 88, 89. The abovementioned belt guides are located in a horizontal plane and move with the motor, the belt guide 90 running in a vertical direction on the lifting slide 29.

It is advantageous, as shown in FIGS. 4 and 5, to have arranged on each milling spindle directly underneath the miller 15 a ventilation wheel 92 which is in the passage aperture 7 when in the working position and blows the chips upwards so as to prevent them from penetrating into the machine through the aperture 7.

From the description given above it will be seen that only a few manipulations are necessary for changing the tool or spindle. It is only necessary to release the clamping sleeve by actuatng the key assembly 16, 17 so that the bearing socket of the working spindle becomes freely movable and it is then only necessary to turn the handwheel 72 in one direction in order to move downwards the working spindle together with the motor and belt drive. Then, after opening the door 87, the spindle support (drum) is turned until the new milling spindle required is in the working position and then it is only necessary to move this spindle with its cutter head upwards by turning the handwheel 72 in the other direction, after which finally the new working spindle is gripped with the clamping sleeve by operating the key assembly 16, 17.

Any displacement of the adjusting lever 83 in relation to the handwheel 87 is only necessary for changing the speed, that is to say if it is necessary to move the V-belt on to another stage of the spindle stage pulley 44.

We claim:

1. Table milling machine with several milling spindles which are arranged on a support which can swivel around a vertical axis in such a way that by swivelling this support one of these milling spindles can be brought into the working position at a time, characterised by the fact that the milling spindle support is arranged underneath a machine table which has an aperture for the passage of the cutter and the milling spindles are mounted so that they can slide vertically on the support in such a way that the particular milling spindle which is required at the time can be moved together with the cutter fixed on to it upwards through the passage aperture into the working position, each of said spindles fixedly carrying a belt pulley, a single motor situated beneath the machine table, and drive means driven by said motor and including a single drive belt situated at said working position and placed by said drive means about each pulley when the spindle carrying the latter is in said working position, so that only a single belt is used for connection to whichever one of said spindle pulleys is at the working position.

2. Table milling machine with several milling spindles which are arranged on a support which can swivel around a vertical axis in such a way that by swivelling this support one of these milling spindles can be brought into the working position at a time, characterized by the fact that the milling spindle support is arranged underneath a machine table which has an aperture for the passage of the cutter and the milling spindles are mounted so that they can slide vertically on the support in such a way that the particular milling spindle which is required at the time can be moved together with the cutter fixed on to it upwards through the passage aperture into the working position, further characterized by the fact that underneath the machine table a single motor is provided which drives the particular milling spindle (working spindle) which is in the working position by means of a belt drive or the like, and further characterized by the fact that the motor for the joint lifting movement with the working spindle is mounted so as to slide on a vertical guide axle and at the same time is arranged so as to swivel around it for the purpose of tightening or releasing the belt, and is arranged in such a way that when the belt is released and removed from the spindle pulley it can be moved further down with it in relation to the working spindle which is in its bottom position and when this happens the spindle support can be swivelled and the belt can be changed to another milling spindle.

3. Table milling machine in accordance with claim 2, characterised by the fact that for the purpose of balancing the weight of the motor a counterweight is arranged in such a way that this at the same time swivels the motor around the vertical guide axle and in this way tightens the belt.

4. Table milling machine in accordance with claim 2, characterised by the fact that the motor is arranged on a support which can be adjusted for height on the guide axle and has a swivelling arm which is advantageously provided with a supporting roller, and in the path of this roller there is arranged a stationary guide wedge which co-operates with it in such a way that the motor, shortly before the working spindle reaches its bottommost position, is swivelled in this direction and in this way the belt is released.

5. Table milling machine in accordance with claim 2 with stepped belt pulleys arranged on the milling spindles, characterised by the fact that for the joint lifting movement of working spindle and motor there are provided two chain drives connected with one another by a clamping or wedge coupling and whose drive wheels are mounted coaxially on a hollow axle which can be rotated by a handwheel or on an axle mounted so as to rotate in the latter, this axle being connected with an adjusting lever which—according to the stage of the belt pulley which is chosen—engages in corresponding holes of the handwheel.

6. Table milling machine with several milling spindles which are arranged on a support which can swivel around a vertical axis in such a way that by swivelling this support one of these milling spindles can be brought into the working position at a time, characterized by the fact that the milling spindle support is arranged underneath a machine table which has an aperture for the passage of the cutter and the milling spindles are mounted so that they can slide vertically on the support in such a way that the particular milling spindle which is required at the time can be moved together with the cutter fixed on to it upwards through the passage aperture into the working position and further characterised by a housing consisting of a base frame, casing and table top, a vertical bearing column connected with the base frame and the table top, a drum mounted so as to rotate on this column and being of polygonal cross section, several clamping sleeves fixed on to the side surfaces of this drum, and bearing sleeves arranged in these sleeves so that they can be adjusted in height and clamped in position and secured against rotation, in which bearing sleeves the milling spindles are mounted.

7. Table milling machine in accordance with claim 5, characterised by the fact that the axle of the adjusting lever is arranged so that it can be moved axially in the hollow axle of the handwheel and a locking bolt which can prevent this from moving axially is provided in such a way that this is only unlocked when the working spindle is in the lowest position and only in this position is it possible for there to take place a mutual displacement as between the adjusting lever and the handwheel and consequently a relative displacement in height as between the motor and the working spindle.

8. Table milling machine in accordance with claim 6, characterised by the fact that the drum has annular tapered clamping surfaces on the top and bottom ends and counter tapered clamping members are provided on the table top and on the bearing column, which co-operate with the clamping surfaces and clamp the drum, the counter-tapered clamping member located on the bearing column being arranged so as to be adjustable in height in such a way that it can be moved upwards for clamping the drum and downwards for releasing it.

9. Table milling machine in accordance with claim 6, characterised by the fact that for the purpose of compensating for the weight the drum is supported on an end bearing of the bearing column by means of springs, advantageously plate springs.

10. Table milling machine in accordance with claim 6, characterised by the fact that on the bearing column there is mounted a vertical guide rail and a lifting slide for the working spindle connected with this by a chain drive, and advantageously this carries the one spindle brake.

11. Table milling machine in accordance with claim 10, characterised by the fact that the lifting slide has a supporting roller and a down-holding device for a lifting ring fixed at the bottom end of each bearing sleeve, and this ring rests on the supporting roller or the down-holding device when the spindle is in the working position.

12. Table milling machine in accordance with claim 11, characterised by the fact that the lifting ring carries a vertical stop rod which can move in a shoulder of the clamping sleeve and on this rod and on the shoulder adjusting nuts are provided for limiting the stroke of the bearing sleeve.

13. Table milling machine in accordance with claim 10, characterised by the fact that for the purpose of balancing the weight of the lifting slide loaded with the working spindle a counterweight is provided.

14. Table milling machine in accordance with claim 1, characterised by the fact that for the purpose of securing the working position of the milling spindle in question a spring-loaded adjusting lever is provided on the casing, advantageously provided with a pulley, and notches are provided on the support or on the drum into which the pulley of the adjusting lever engages.

15. Table milling machine in accordance with claim 8, characterised by the fact that an eccentric shaft is provided which is controlled or swivelled by the upwards and downwards movement of the motor and this brings about the clamping or releasing of the counter-taper arranged on the bearing column.

16. Table milling machine in accordance with claim 8, characterised by the fact that a bolt rod is provided which engages in corresponding holes provided in the drum and secures the drum against twisting round, and this locking rod is connected with the eccentric shaft in such a way that when the motor moves downwards the drum is unbolted and when it moves upwards it is bolted with the bolt rod.

17. Table milling machine in accordance with claim 1, characterised by the fact that on each milling spindle there is arranged directly underneath the miller a ventilator wheel which blows the milling chips upwards and prevents them from penetrating into the machine through the aperture in the table top for the passage of the miller.

References Cited by the Examiner
UNITED STATES PATENTS

| | | | |
|---|---|---|---|
| 126,232 | 4/1872 | Piper | 144—145 |
| 319,413 | 6/1885 | Horton. | |
| 1,530,819 | 3/1925 | Ensign | 77—25 |
| 1,742,217 | 1/1930 | Renwick. | |
| 2,738,691 | 3/1956 | Schwab | 77—25 |
| 2,825,414 | 3/1958 | Page | 29—954 |

WILLIAM W. DYER, JR., *Primary Examiner.*

L. VLACHOS, *Assistant Examiner.*